(12) United States Patent
Turner

(10) Patent No.: US 7,687,727 B2
(45) Date of Patent: Mar. 30, 2010

(54) WEIGH ON THE FLY

(75) Inventor: Bryan J. Turner, Redmond, WA (US)

(73) Assignee: RAF Technology, Inc., Redmond, WA (US)

( * ) Notice: Subject to any disclaimer, the term of this patent is extended or adjusted under 35 U.S.C. 154(b) by 0 days.

(21) Appl. No.: 11/855,130

(22) Filed: Sep. 13, 2007

(65) Prior Publication Data

US 2009/0071728 A1 Mar. 19, 2009

(51) Int. Cl.
*G01G 19/413* (2006.01)
*G01G 9/00* (2006.01)

(52) U.S. Cl. .................... 177/1; 177/25.15; 705/407; 705/414

(58) Field of Classification Search ............ 177/1, 177/25.13, 25.15, 145; 702/101, 102; 705/407, 705/414–416
See application file for complete search history.

(56) References Cited

U.S. PATENT DOCUMENTS

| | | | | |
|---|---|---|---|---|
| 3,648,839 | A * | 3/1972 | Bradshaw et al. | 209/593 |
| 3,805,904 | A * | 4/1974 | Zimmerer | 177/1 |
| 3,834,474 | A * | 9/1974 | Knol | 177/1 |
| 4,262,763 | A * | 4/1981 | Raskin | 177/4 |
| 4,696,358 | A * | 9/1987 | Doerman et al. | 177/145 |
| 4,916,391 | A * | 4/1990 | Doerman et al. | 324/207.18 |
| 5,308,932 | A | 5/1994 | Manduley et al. | |
| 5,393,939 | A * | 2/1995 | Nasuta et al. | 177/145 |
| 5,547,034 | A * | 8/1996 | Wurz et al. | 177/25.13 |
| 5,869,092 | A * | 2/1999 | Hays et al. | 424/450 |
| 5,939,646 | A * | 8/1999 | Fowler | 73/862.193 |
| 6,940,025 | B1 * | 9/2005 | Salomon | 177/25.15 |
| 7,096,152 | B1 | 8/2006 | Ong | |
| 7,271,352 | B2 | 9/2007 | Rabindran | |
| 7,297,879 | B2 * | 11/2007 | Salomon | 177/1 |
| 7,550,681 | B2 * | 6/2009 | Wang et al. | 177/1 |
| 2005/0205307 | A1 * | 9/2005 | Salomon | 177/1 |

(Continued)

FOREIGN PATENT DOCUMENTS

WO WO2007031176 A 3/2007

(Continued)

OTHER PUBLICATIONS

WIPOTEC Principle of Operation/on-line http://www.industrialcontroller.com/wipotec/operation.htm/pp. 1-2.

(Continued)

*Primary Examiner*—Randy W Gibson
(74) *Attorney, Agent, or Firm*—Stolowitz Ford Cowger LLP

(57) ABSTRACT

Methods and apparatus for weighing an article, such as a mail piece, while the article is moving, for example along a transport path (FIG. 2). In one embodiment, a weigh station comprises a servo motor 110 driven by a servo feed back loop (126, 128) to maintain a selected speed setting 130. When an article is introduced, an impulse is applied to the article sufficient to change its state of motion from its initial state to the selected speed setting. That impulse is applied by the servo motor 110, and the system captures data indicative of the applied impulse, by monitoring the motor current (140, 142). A processor 140 or software converts the captured data to determine a weight of the article, based on stored calibration data 148.

4 Claims, 8 Drawing Sheets

U.S. PATENT DOCUMENTS

2005/0267848 A1  12/2005  Kenbeek
2009/0216487 A1   8/2009  Streder et al.

FOREIGN PATENT DOCUMENTS

WO    WO2007031176  A1    3/2007
WO    WO2009036251  A1    3/2009

OTHER PUBLICATIONS

International Searching Authority USPTO; International Search Report and Written Opinion; Jan. 7, 2009; 14 pages.

European Patent Office, European Search Report for Application No. 09252332.3-2213, mail date Dec. 3, 2009, 7 pages.

* cited by examiner

WEIGH ON THE FLY

RELATED APPLICATIONS

None.

COPYRIGHT NOTICE

© 2007 RAF Technology, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This invention pertains to methods and apparatus for accurately determining mass-related properties of an article, such as weight or moment of inertia, and more specifically it pertains to weighing articles that are in motion.

BACKGROUND OF THE INVENTION

Many weighing systems are known, some dating back to biblical times. More recently, weighing systems have been developed for weighing each one of a stream of articles, such as mail pieces or parcels moving through a transport or mail sorting system. Prior art systems of that type are shown, for example, in U.S. Pat. Nos. 7,096,152 and 3,648,839.

Some known systems rely on back-EMF or "Electro Magnetic Force Restoration" principles. According to one vendor, "an applied load is compensated for by an electromagnetically produced counterforce. A precision position control (optical) keeps the system stable. The slightest movement is detected, initiates a feedback circuit to run current through a coil and causes the load to be returned to its original position. The coil current, which is proportional to the weight, is transmitted to an internal A/D converter then processed in the microprocessor." See http://www.industrialcontroller.com/wipotec/operation.htm (Wipotec principles of operation).

The need remains for improvements in accuracy, speed (throughput), reduced cost, and reducing the need for frequent re-calibration of weighing systems. The present application achieves these and other goals by applying a dramatically different approach to the problem as further explained below.

SUMMARY OF THE INVENTION

In one aspect, the present disclosure is directed to determining mass-related properties of articles "on the fly," i.e., as they move through a transport mechanism, by measuring an applied impulse required to move the article from one state to another. For example, an impulse can be applied to accelerate an article from a first velocity to a second (greater) velocity. That "impulse" can be applied through various electromechanical contrivances such as a motor. The magnitude of the impulse can be measured in various ways. In one embodiment, an impulse is measured indirectly by monitoring the current applied through a servo motor to accelerate the article. In the detailed description below, we discuss mainly "weighing" of articles, but other embodiments and applications within the scope of the present disclosure can be arranged to measure mass-related article properties such as moment of inertia as well. Further, much of what follows discusses a straight-line movement of the article, but a rotational or other system of movement is also within the purview of the present disclosure.

In one class of embodiments, an article whose mass-related property is to be measured is presented, for example by entering a "weighing station" via a transport mechanism such as a belt transport. Details of such transport mechanisms are well known in various contexts, including mail sorting machines. In alternative embodiments, the weighing apparatus might be used separately, for example in a machine arranged to apply the correct postage to a mail piece. In still other applications, the weighing apparatus may be used to provide rapid, accurate weighing of articles or materials, such as chemicals, pharmaceuticals or other substances unrelated to postal services. The concept of the present invention is applicable over a wide spectrum of applications which can involve articles weighing anything from micrograms to tons.

In general, a weighing apparatus in accordance with the present disclosure receives an article that has a measured or otherwise known initial state of movement (or rest). There is also a predetermined or "commanded" final state of movement (or rest) of the article. And finally, a mechanism is provided that applies an impulse to move the object from its initial state to the commanded final state. (The term "mechanism" is used in this application in a broad sense. It is not limited to purely mechanical contrivances; to the contrary, it refers to any and all mechanical, electrical, optical, electromechanical systems, software controlled systems, and combinations thereof that provide the described functionality.)

The impulse-applying mechanism must include or be coupled to some means of measuring or capturing information as a proxy for the actual impulse. In other words, the impulse typically is measured indirectly. For example, a curve of the current that supplies the torque that applies the impulse through a motor can be used to infer sufficient information about the applied impulse. The measured proxy is then calibrated by articles of known mass-related properties and the calibrated values are used to determine the article's mass-related properties. The use of calibration is an important part of the system because it allows considerable simplification to take place. As explained below, in a preferred embodiment, this approach obviates the need for actual or absolute measurements such as article velocity. Indeed, velocity is not critical and need not be measured in absolute terms.

One primary improvement of the present invention over prior art is that it allows weighing of articles at normal transport speeds; for example, hundreds of inches per second for mail pieces, potentially freeway speeds for vehicles.

Additional aspects and advantages of this invention will be apparent from the following detailed description of preferred embodiments, which proceeds with reference to the accompanying drawings.

DETAILED DESCRIPTION OF PREFERRED EMBODIMENTS

Figure 1:
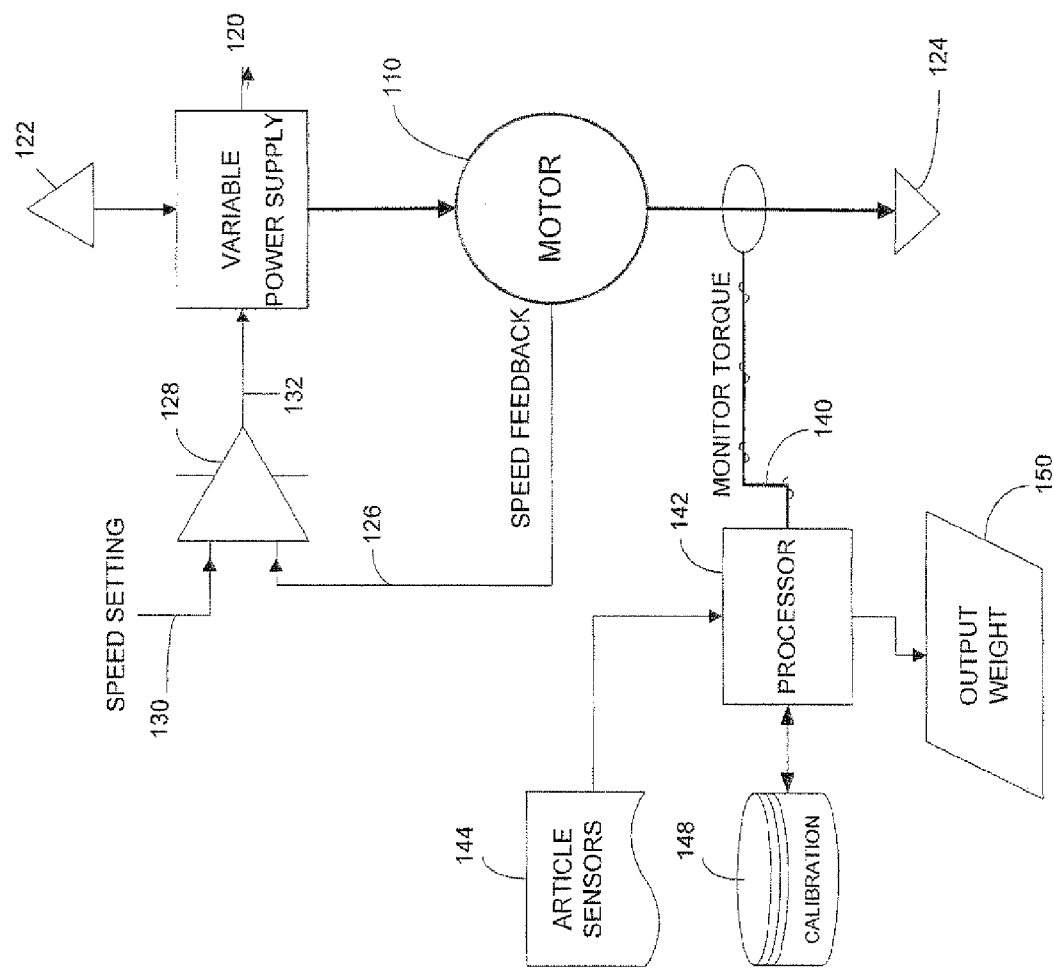
FIG. 1 is a simplified electrical schematic diagram illustrating one embodiment of a system for weighing articles on the fly.

Turning now to FIG. 1, a simplified electrical schematic diagram is shown illustrating one embodiment of a system for weighing articles on the fly. In FIG. 1, a servo motor 110 is driven by a variable power supply 120 which is coupled to a power source 122. In operation, current flows through the motor to ground 124. A speed sensor (not shown) is coupled to the motor 110 to provide a speed feedback signal 126. Various sensors can be used such as shaft encoders, optical sensors, etc. to accurately monitor speed or rotation of the motor 110. The speed feedback signal is provided to an error amplifier 128, such as an op-amp, which compares the current speed to a predetermined input speed setting 130. An error signal 132 related to the difference between the two inputs is input to the power supply 120 to control the motor current through 110 so as to maintain the motor speed at the speed setting 130 in the steady state. A change in the load on the motor, however, will result in a transient in the motor current indicative of that change in loading. That transient current level is captured as a proxy indicative of an impulse applied to the article.

Still referring to FIG. 1, the motor current is monitored and a motor current signal 140 related to the monitored current level, for example proportional to the current level, is input to a processor 142. This is not necessarily a stand-alone processor, but it may be any programmable digital processor, or a software component arranged to implement the described functionality on a dedicated processor or as part of a larger system. Article sensors 144, for example optical sensors (photodiodes, etc.), detect when each article of interest enters and leaves the weigh station, as further explained below with reference to other figures. A calibration data store 148 stores calibration data, which can include steady-state or "no load" measurements, taken when no article is present, as well as data taken from measurement of articles having known mass. This data is used by the processor 142 to determine the article weight, and the result is output, for example displayed, printed, or stored in digital file, as indicated at 150 in the drawing.

Figure 2:
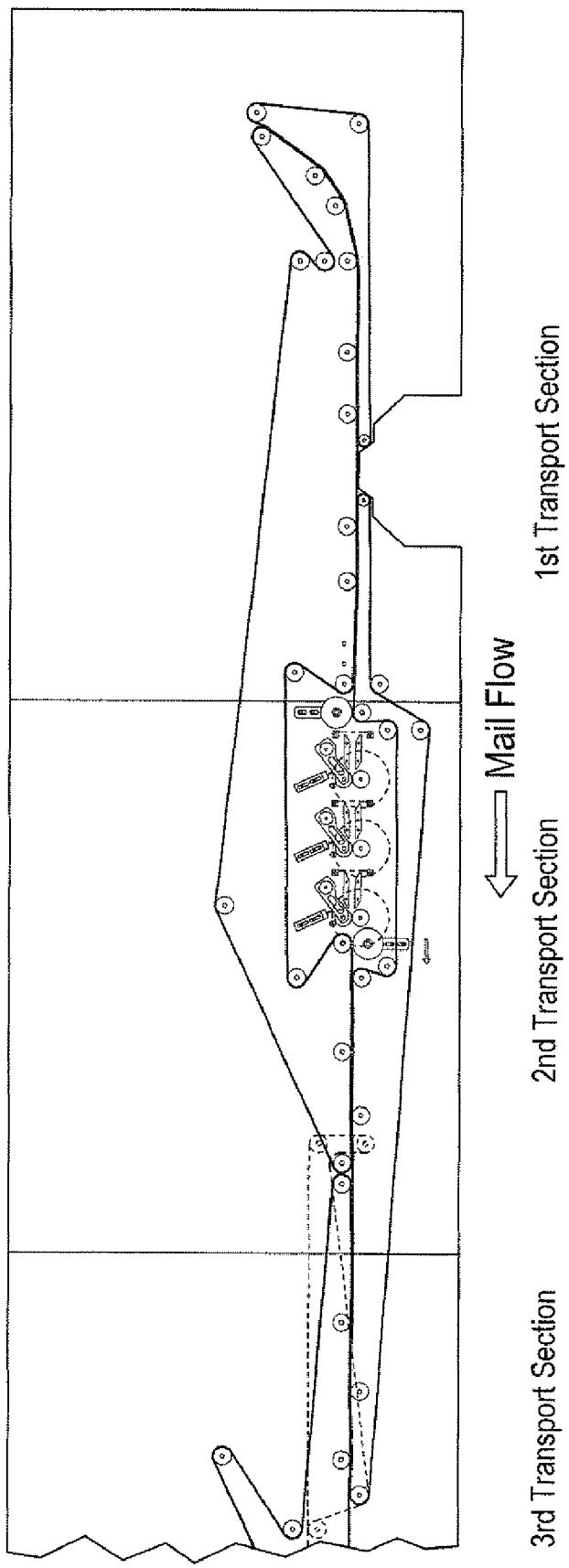
FIG. 2 is a mechanical drawing in top view of an article transport apparatus including a weigh station in accordance with one embodiment of the present invention.
Figure 3:
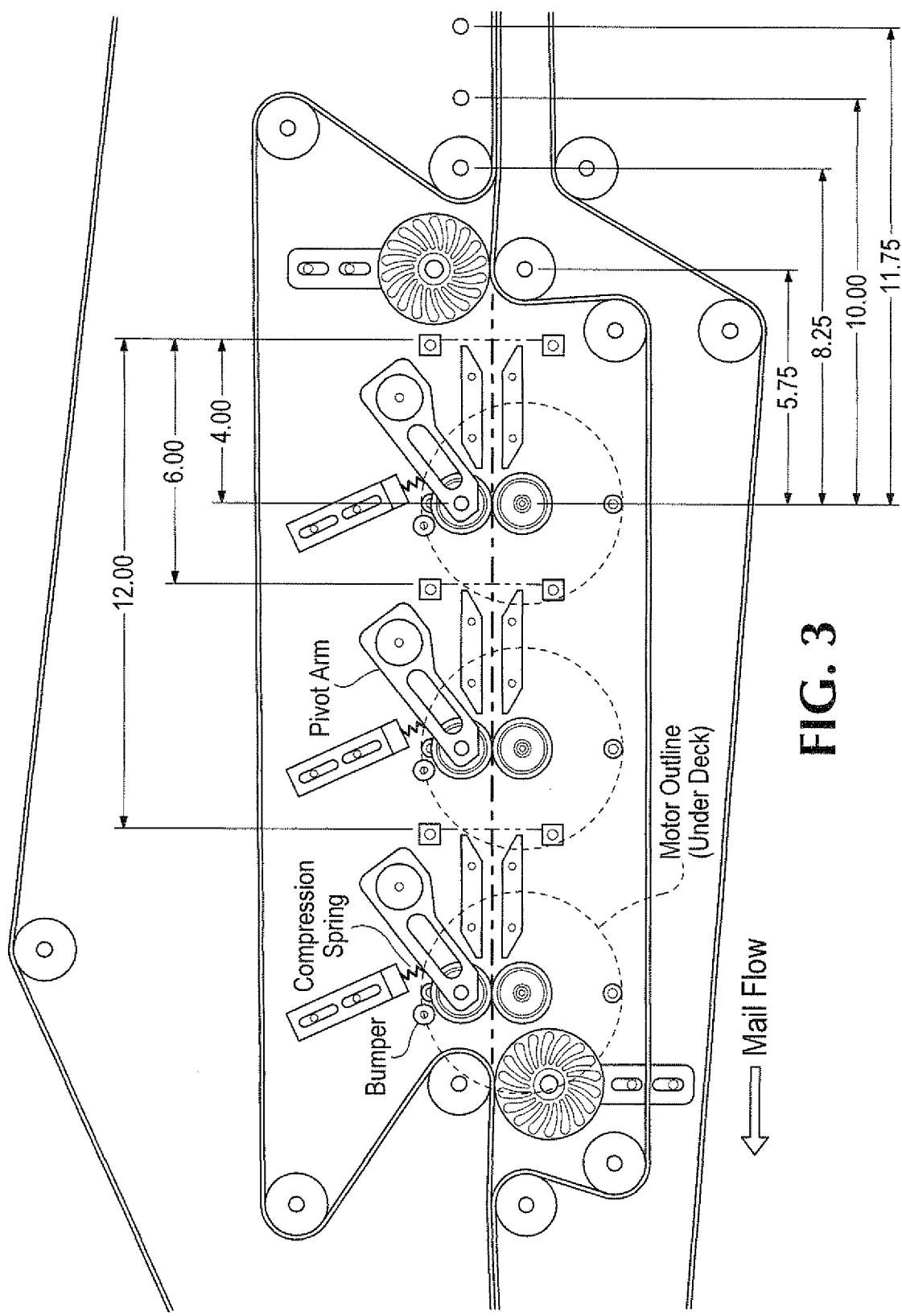
FIG. 3 is a mechanical drawing in top view showing greater detail of the weigh station of FIG. 2.
Figure 4:
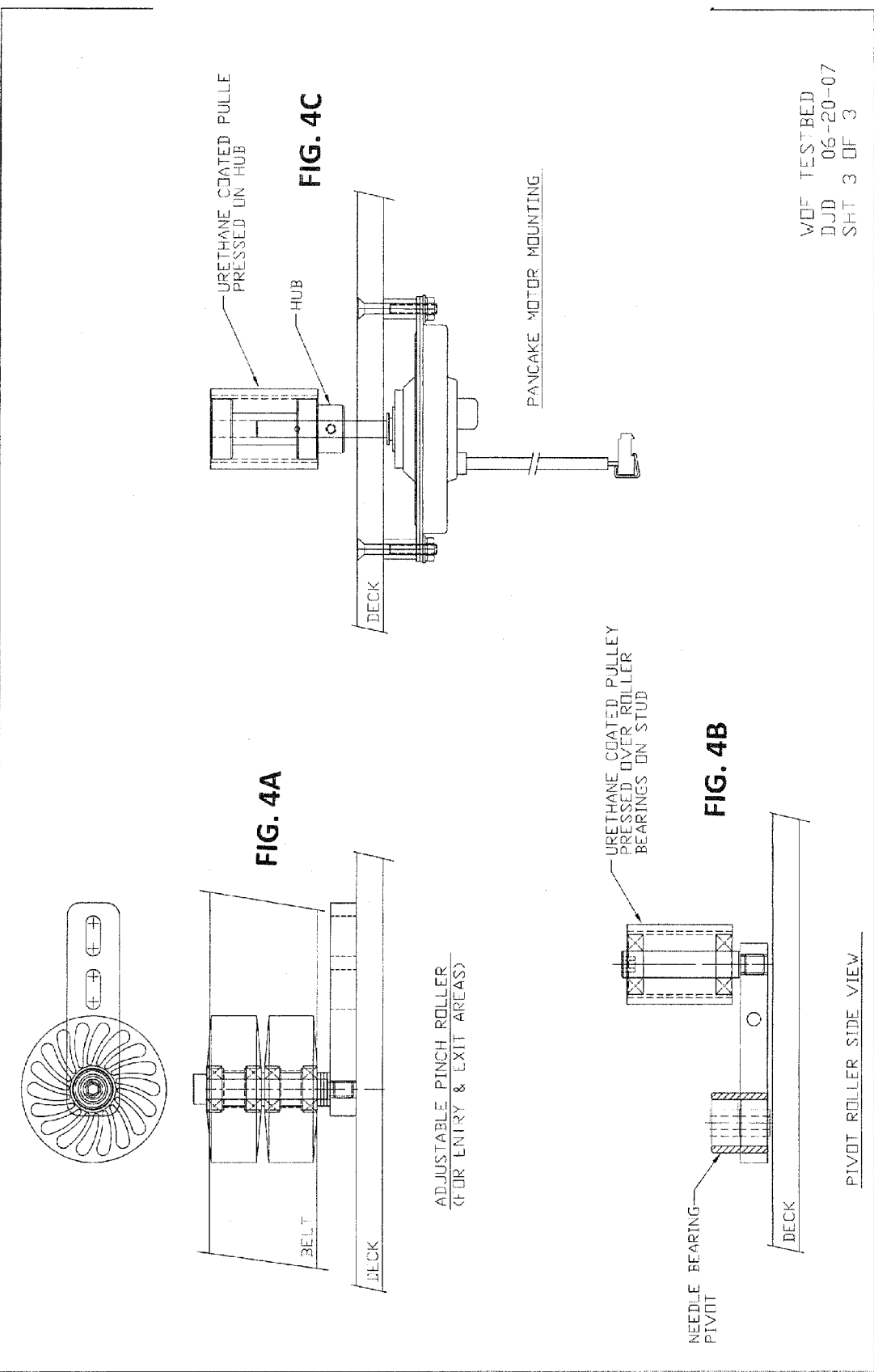
FIG. 4A comprises top view and cross-sectional views of an adjustable pinch roller assembly for use in the transport apparatus of FIG. 2.
FIG. 4B is a cross-sectional side view of a pivot roller assembly of a type useful in the weigh station of FIG. 2.
FIG. 4C is a side view of a pancake motor mounting in the article transport apparatus of FIG. 2.

FIG. 2 is a mechanical drawing in top view of a belt-driven article transport apparatus. In operation, articles move from right to left in the drawing, from a first transport section, into a second transport section (where a weigh station will be implemented as described below), and thence to a third or output transport section on the left. FIG. 3 is a mechanical drawing in top view showing greater detail of the second transport section of the apparatus of FIG. 2. Referring to FIG. 3, articles enter from the right through a variable pinch roller pair, past a first photosensor, between a pair of fixed non-friction guides, and into a first motor assembly. The first photo sensor, together with second and third photo sensors described below, generally correspond to the article sensors 144 of FIG. 1. The first motor assembly comprises a motor driven hub, and an opposing spring-loaded pinch roller mounted on a pivot arm, controlled by a solenoid (not shown), for controllably moving the opposing roller into contact or near contact with the said hub so as to form a pinch roller pair for engaging the moving article. The first motor operates at the same speed as the belt-driven first transport section to normalize the speed of the article for articles of different lengths. Accordingly, each article enters the second transport section at the same speed. The actual or absolute value of that speed is not critical for present purposes. In contradistinction to prior art, the present system does not rely on speed measurements.

Figure 5:
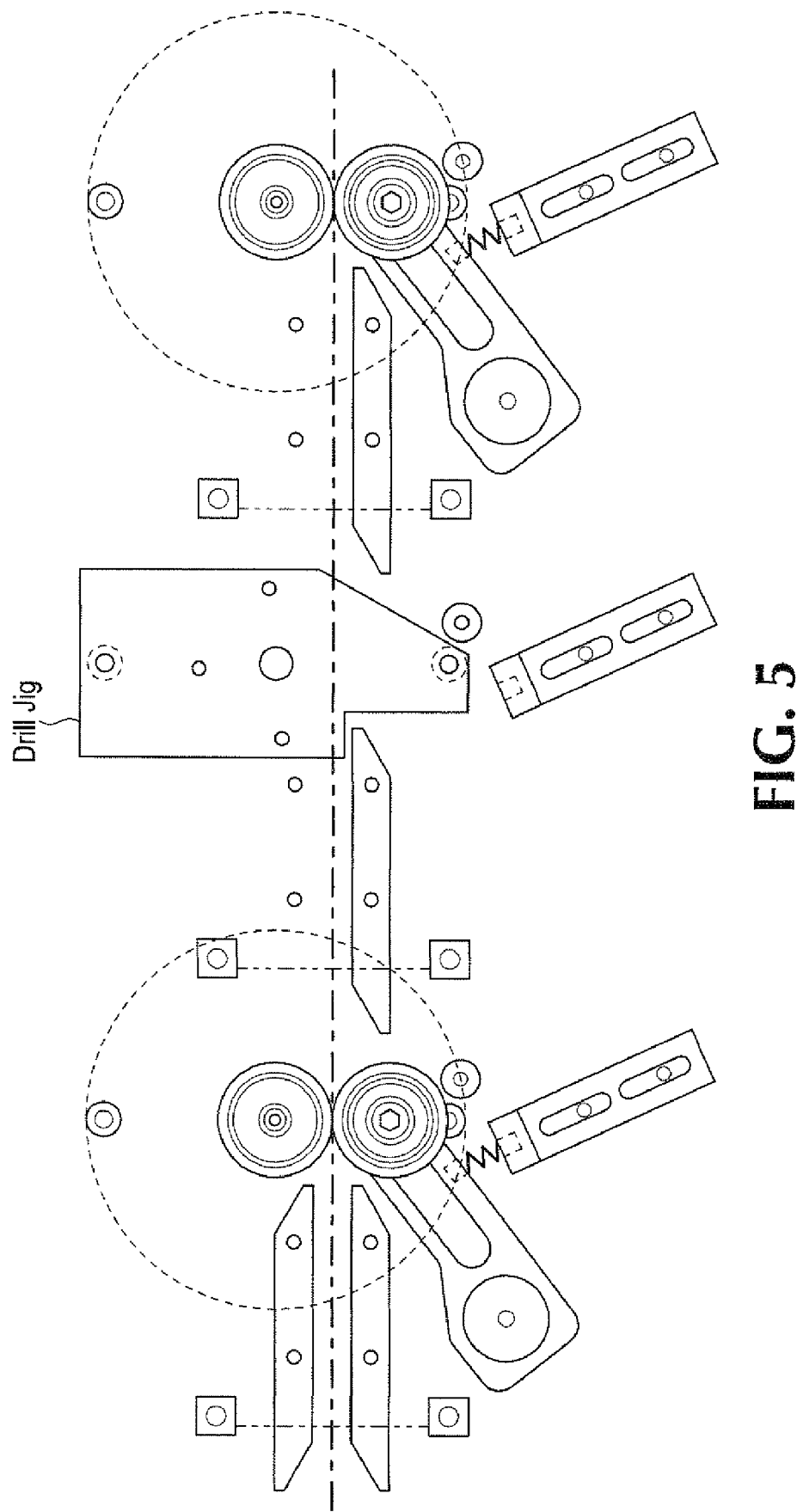
FIGS. 5-6 are mechanical drawings in top view illustrating a procedure for replacing a pancake motor with a precision servo motor in the assembly of FIG. 2.
Figure 6:
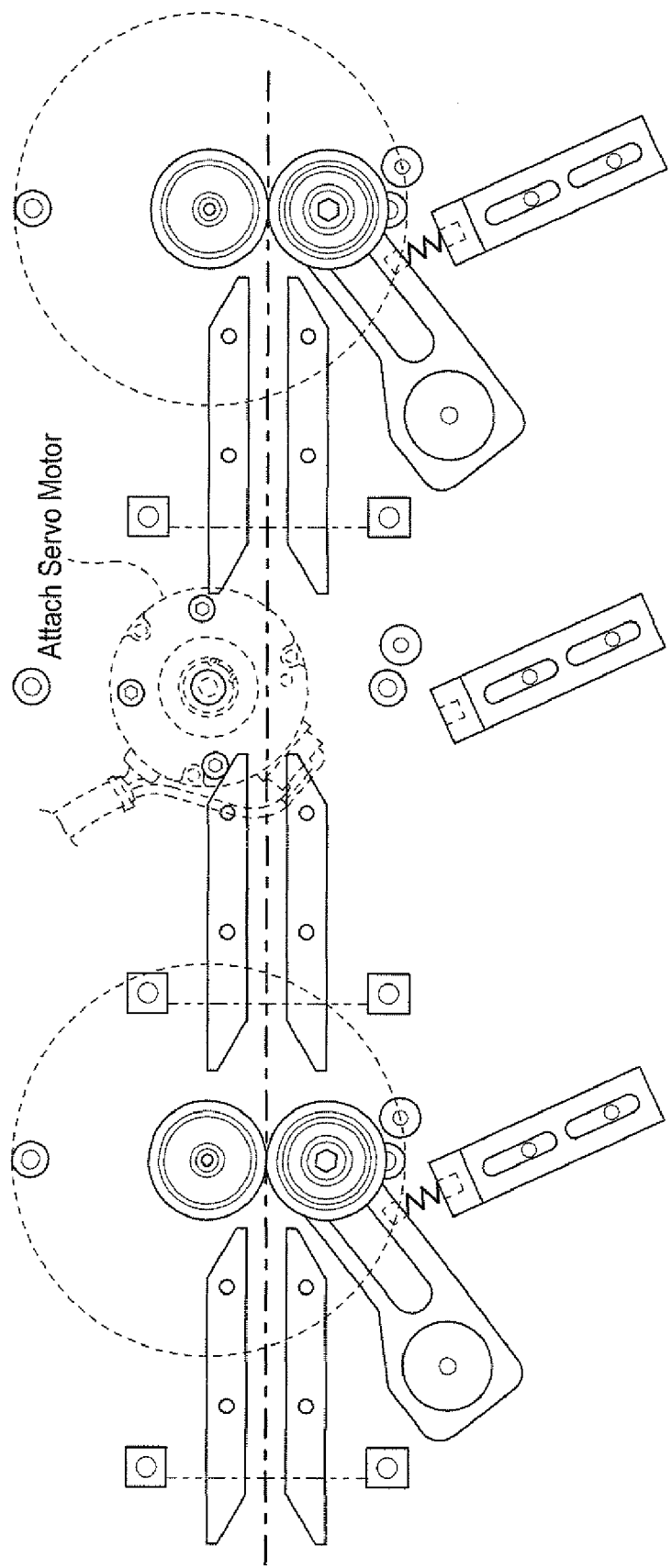
Figure 7:
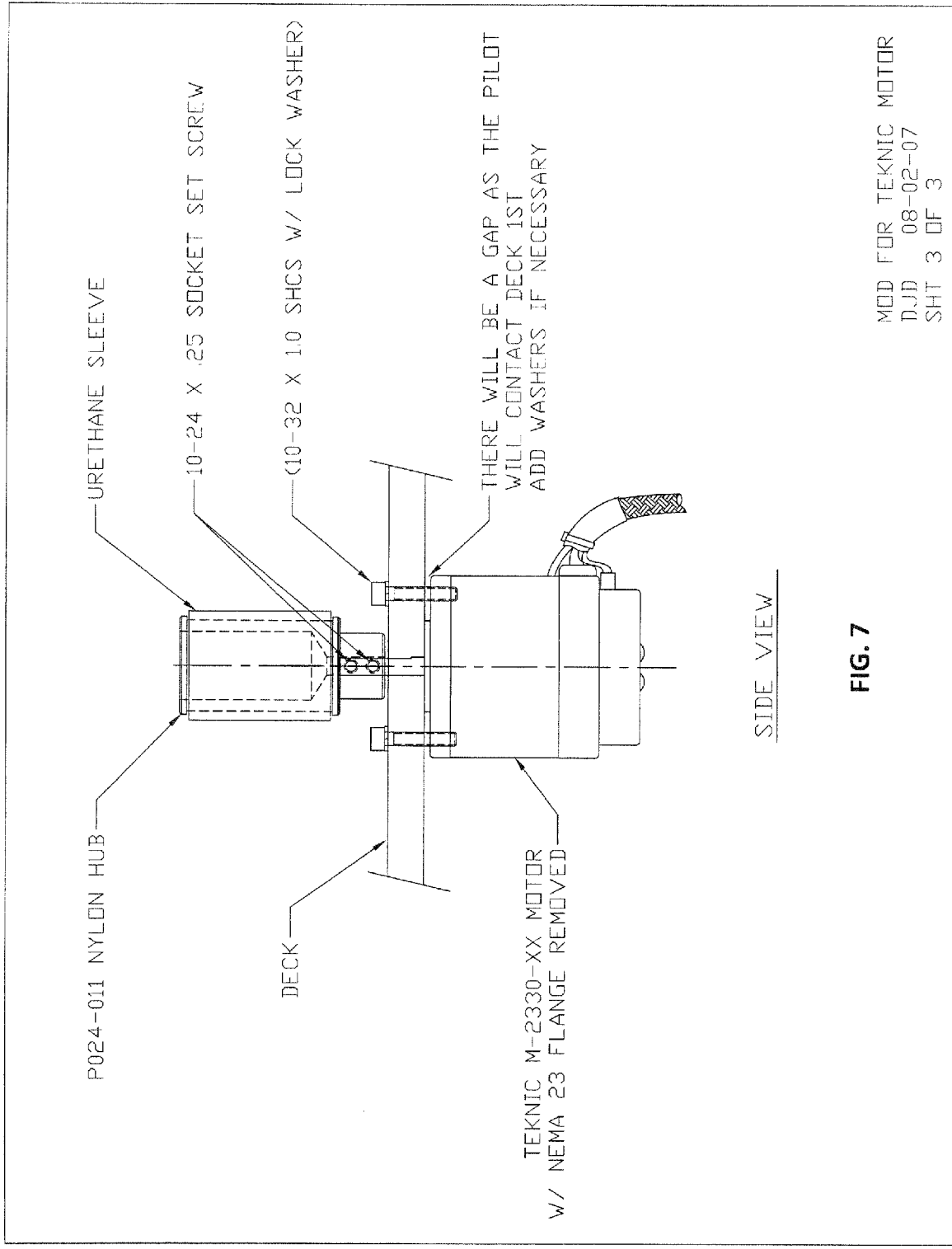
FIG. 7 is a side view illustrating a precision servo motor installed below a transport deck of a transport assembly with a sleeved hub installed for engaging an article moving through the transport assembly.

A second photo sensor detects movement of the article from the first section into the second section. The second section comprises a second motor assembly, similar to the first section. However, in accordance with the present invention, the second section is modified by replacing the common DC brush motor with a precision servo system. FIGS. 5-6 are mechanical drawings in top view illustrating a procedure for replacing a pancake motor with a precision servo motor in the assembly of FIG. 2. The Teknic model M-2330 motor is just an illustrative example of such a servo motor. Other precision motors can be used and should be considered equivalents. From this point forward, we assume such modifications have been done, as described in the drawing, so that the second section motor assembly now employs a servo system (see FIGS. 6-7), in lieu of the pancake type motor used in the first and third transport sections. A third photo sensor detects movement of the article from the second section into the third section. The third transport section (see FIG. 2) re-establishes the article speed to the system belt speed.

Accordingly, in one embodiment, a transport mechanism (first section) projects an article at some initial velocity into the measuring apparatus. For example, in mail piece handling, a belt driven transport mechanism is commonplace. That velocity is known to the system itself (for such things as spacing the articles along their route), but its value is not important and indeed is neither calculated nor used in the process of weighing the article. This ignorance by the weighing mechanism of the initial velocity of the article is material, since much of the prior art measures mass by calculating the difference between initial and final velocities of the article. Since the initial velocity is not provided to the weighing apparatus, such approach is precluded.

In one embodiment (see below for others) the article then enters a measuring apparatus which pinches the article between two rollers. In the illustrative example in the drawings, the "measuring apparatus" generally corresponds to the second transport section, also referred to as a weigh station. The measuring apparatus has been commanded to output the article at a second velocity (which may be higher, lower, or identical to the input velocity). This corresponds to the speed setting 130 of FIG. 1. The pinch rollers are driven by a servo mechanism (see FIG. 1) that measures the angular velocity of a motor that drives one of the rollers, compares it to the desired angular velocity (at which the article would be moving at the ordered output velocity), and supplies sufficient current to achieve the desired final angular velocity. The specific profile of intermediate velocities ordered for or achieved by the system are unimportant, though the proposed system includes devices that accelerate and then decelerate the article (or the other way around) so that its final velocity may be the same as its initial velocity. So, for example, the weigh station may first accelerate, and then decelerate the article, arriving at the same velocity as the initial velocity, but gathering current data in the meantime.

The solenoids that operate the pinch roller pivot arms are controlled so that, while an article is in the second section (weigh station), as detected by the photo sensors, the first and third transport section rollers are withdrawn from the motor hubs so that the weigh station pinch roller assembly supports the article. In this way, acceleration and deceleration of the article are accurately reflected in the servo loop that drives the weigh station servo motor.

It is important to state that it does not matter what that final angular velocity is. Unlike prior system, such as those disclosed on U.S. Pat. Nos. 7,096,152 or 3,648,839 (see below), the proposed system makes no absolute measurements at all. It works on calibration, not absolute measurements.

The application of a precision instrument grade servo system to the problem of weighing mail pieces or parcels while they are moving at a high speed enables multiple approaches to mass calculation. Since the servo mechanism is in continuous communication and control of all of the moving roller system components prior to introduction of the item to be weighed, a state of nominal motion or equilibrium can be established and related to the zero state of the scale. (Recall zero state data can be stored in data store 148 of FIG. 1.) Upon introduction of the subject article (which may be a mail piece, a parcel, or other object), this equilibrium is disturbed and the servo mechanism, by way of electronic and mechanical feedback loops (one example is illustrated above), rapidly injects correcting signals to re-establish the nominal motion state. By measuring the error-correcting signals generated by the servo system and scaling by a calibration factor, a mass calculation can be made.

Since much of the prior art discusses calculating the weight (mass) of the articles, it bears mentioning here that the proposed system can work quite well with no actual calculation of article mass at all. All that really matters is the comparison of the mass-related property of the article to the mass-related properties of one or more calibration articles.

Figure 8A:
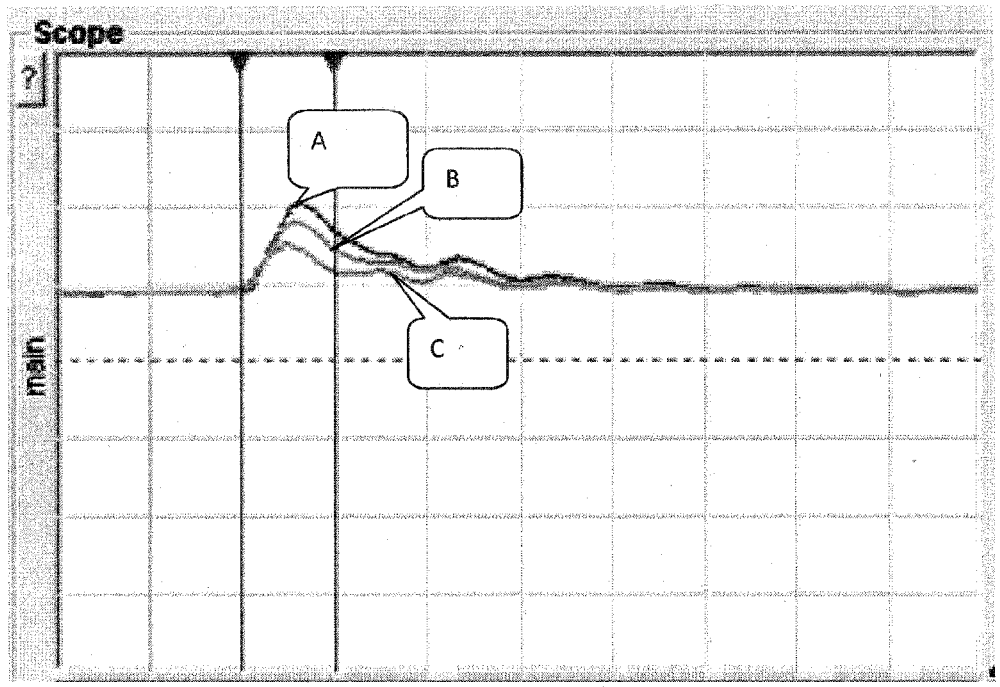
FIGS. 8A and 8B are oscilloscope traces of servo motor torque measurements taken in a development prototype weighing system in accordance with the present invention.

FIG. 8A depicts a 5 gram differential torque measurement from the weigh on the fly prototype. Trace "C" is 12 grams, "B" is 17 g and "A" is 22 g. Vertical scale is ounce inches of servo motor torque and horizontal is time. The green vertical cursor is the point at which the mail piece trips the photo eye for the center roller system. The other cursors are not relevant.

Figure 8B:
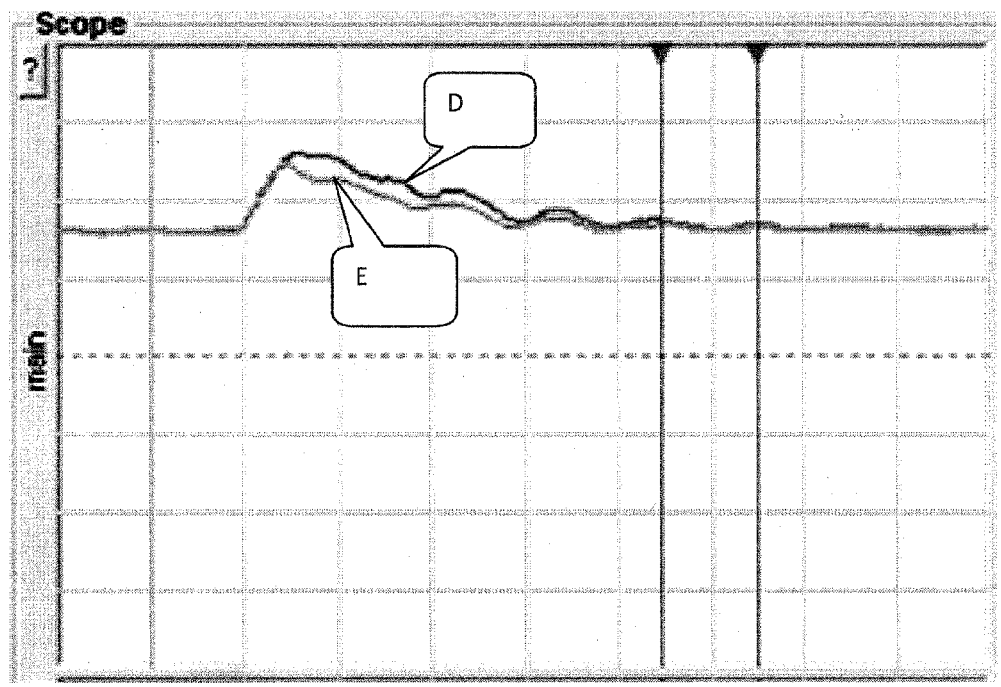

FIG. 8B shows traces of 2.5 gram differential. The "E" line is 14.5 g and trace "D" is 17 g. These waveforms are of slightly different shape from the previous image due to increased oscilloscope gain and different mechanical settings on the test bed transport. These traces show clear resolution even down to 2.5 grams. We believe this can be extended to considerably finer resolution while continuing to process at full speed (e.g. 40,000 pieces per hour).

Other embodiments include but are not limited to the following:

Maintaining a state of angular momentum associated with the nominal zero state and then measuring the incremental torque required to re-establish the velocity of the nominal zero state but now including an incremental mass (e.g. a mail piece).

Maintaining a nominal zero state of motion with an associated constant torque and then measuring the difference in angular displacement of the rotating components when an incremental mass is introduced. The difference in angular displacement is compared between the zero and the loaded state over equal and fixed time intervals or over intervals whose ratio is known to the system.

Maintaining a nominal zero state of motion with an associated constant torque and then comparing the time differential required to attain a fixed displacement.

Introducing an acceleration command and then measuring the torque differential required to maintain that acceleration.

In some embodiments the proposed system accomplishes its mass-related measurement without materially altering the articles' velocity through the system. One example of this would be to measure to torque required to maintain constant velocity against increased mass-related friction forces caused by the introduction of the article into the weighing apparatus.

Since the servo system is in constant control of the roller mechanism, it is also possible to measure sustained torque differential in addition to the torque impulse as claimed earlier. Using this model, there is no need to set the roller mechanism at a different speed than the belt system nor is any change in velocity required to effect the mass measurement. This derives from the fact that the change in system momentum from the zero state to the weighing state will require a differential torque to sustain even a constant velocity.

This can be understood by recognizing that the normal friction forces on the motor and roller system will introduce a negative acceleration on the system mass if a sustaining torque does not counter it. Since the friction force is constant, when an incremental mass is introduced, the system will have a different acceleration in the absence of a sustaining torque. Since the friction force is constant, the differential acceleration would tend to be smaller for a larger mass. Therefore the torque required to maintain the velocity of the now increased system mass would also be different. We can measure this incremental torque and compare with that of the zero state of the system and also with a calibration factor to scale the measurement. Since torque is linear with respect to mass of the system, the calculation is quite straight forward and does not required heuristics or curve fitting.

Non-linear relationships between the mass-related property of the article and the measured property (e.g. current for producing torque) are also envisioned by the proposed system. In such a case sufficient calibration is required as to adequately define the relationships. It is not a requirement of the proposed invention that the article be propelled by a transport mechanism. It can for example, be self-propelled. In one embodiment, the object is a truck which moves at some measured velocity into the weighing apparatus.

One possible system use is sorting the objects into bins based on their determined weight (though this sortation is not a requirement of the proposed system). Another use may be to assess taxes based on vehicle weight (for, say, a truck).

An alternative embodiment to the pinch roller system discussed above is to use a forced air column opposite the servo roller in place of the pinch roller. This has several advantages: The entry impulse will not be effected by thickness since there will be no pinch roller and swing arm to displace. Moreover, the force imposed by the air column will be constant and not variable with thickness.

The air column can be switched rapidly thereby allowing the torque measurement to be taken after the leading edge of the piece has passed. The air column could actually keep the servo roller clean.

Yet another embodiment uses gravity to hold the article against the impulse-providing mechanism.

It is not necessary for the proposed invention that the impulse-providing device rotate. All that is necessary is that it provide an impulse to achieve an ordered final state of motion of the article, that the power (electrical or other) that provides the impulse be measured, and that the results be compared with the results of providing impulse to objects of known properties passing through the system.

It is not necessary for the proposed system that the impulse provided to the article be tangential to the article. It can, for example, be transverse. What matters is that the system has an initial state, a final state, and a method for measuring some stand-in indicative of the impulse that moves the object from its initial to its final state. It then must compare that measurement with the measurement of the stand-in required to change the state of one or more articles of known mass-related properties.

In one embodiment the mass-related property of the article is deduced by interpolating between the mass-related properties of calibration articles. This interpolation may be linear, polynomial, or any other method.

In another embodiment the article's mass-related property may be determined to be larger than or smaller than some threshold without determining either the article or the calibration object's actual mass-related property. Thus if an object of maximum mass were used for calibration, and if objects of mass greater than this maximum are to be routed from the system, it is sufficient to know whether or not the article to be measured is more massive than the calibration mass.

It will be obvious to those having skill in the art that many changes may be made to the details of the above-described embodiments without departing from the underlying principles of the invention. The scope of the present invention should, therefore, be determined only by the following claims.

The invention claimed is:

1. A method for weighing a moving article comprising the steps of:
   receiving the article while it is moving at an initial non-zero speed;
   selecting a predetermined constant final speed of the article that is higher or lower than the initial speed;
   applying an impulse to the article by means of a precision servo motor sufficient to accelerate the article from the initial speed to the final speed without stopping the article or changing its direction;
   wherein the precision servo motor is controlled by a close-loop control system responsive to changes in the speed of the article;
   capturing motor current or torque data indicative of the applied impulse;
   converting the captured motor data to determine a weight of the moving article; and
   providing the determined weight of the article in a tangible, useful form by displaying it, storing it in a digital file, or communicating it electronically to be used as an input to a subsequent system or process that takes an action associated with the article responsive to its determined weight.

2. A method according to claim 1 wherein said applying an impulse comprises, in the close-loop control system, varying a power supply current applied to the precision servo motor so that the torque of the motor applies the impulse;
   and then varying the power supply current applied to the motor so as to drive the motor to the constant final speed.

3. A method according to claim 2 wherein said capturing data comprises, in the close-loop control system, monitoring the power supply current applied to the motor.

4. A method for weighing mail pieces in a moving stream of mail pieces, the method comprising the steps of:
   providing a precision servo motor and a capstan roller operatively mounted to the servo motor;
   locating the capstan roller adjacent to an opposing pinch roller;
   receiving and gripping a moving mail piece between the pinch roller and the capstan roller so that the mail piece and the servo motor are moving substantially in unison;
   providing a closed-loop control system operatively coupled to the servo motor;
   selecting a constant servo motor input speed setting to correspond to a selected mail piece speed that is substantially greater than an expected initial speed of the moving mail piece when it is received, and inputting the constant input speed setting to the closed-loop control system;
   driving the servo motor toward the constant input speed setting by operation of the closed-loop control system while the mail piece is gripped between the pinch roller and the capstan roller and still moving;
   while the closed-loop control system is driving the servo motor toward the constant input speed setting, capturing servo motor torque or current data; and then
   calculating a weight of the mail piece based on the captured servo motor data, without regard to the actual or final velocity of the mail piece.

* * * * *

UNITED STATES PATENT AND TRADEMARK OFFICE
CERTIFICATE OF CORRECTION

PATENT NO. : 7,687,727 B2
APPLICATION NO. : 11/855130
DATED : March 30, 2010
INVENTOR(S) : Bryan J. Turner It is certified that error appears in the above-identified patent and that said Letters Patent is hereby corrected as shown below:

Column 7, lines 42-43 (Claim 1):   Delete "close-loop" and insert -- closed-loop --, therefor;

Column 8, line 10 (Claim 2):   Delete "close-loop" and insert -- closed-loop --, therefor; and Column 8, line 16 (Claim 3):   Delete "close-loop" and insert -- closed-loop --, therefor.

Signed and Sealed this

Fourteenth Day of December, 2010

David J. Kappos
*Director of the United States Patent and Trademark Office*